US005686784A

United States Patent [19]

Thoms et al.

[11] Patent Number: 5,686,784

[45] Date of Patent: Nov. 11, 1997

[54] COMPOSITE SHIFTABLE APERTURE MASK

[75] Inventors: Roland Thoms, Freiburg; Klaus-Peter Helmetag, Hagen-Holthausen, both of Germany

[73] Assignee: Wickeder Westfalenstahl GmbH, Germany

[21] Appl. No.: 402,796

[22] Filed: Mar. 13, 1995

[51] Int. Cl.[6] ........ H01S 29/80

[52] U.S. Cl. ........ 313/402; 313/407

[58] Field of Search ........ 313/402, 403, 313/404, 405, 406, 407, 408

[56] References Cited

U.S. PATENT DOCUMENTS

| | | | |
|---|---|---|---|
| 3,909,656 | 9/1975 | Stachniak | 313/402 |
| 4,629,932 | 12/1986 | Tokita | 313/402 |
| 4,996,458 | 2/1991 | Hattori | 313/402 |
| 5,079,477 | 1/1992 | Yamamoto | 313/402 |
| 5,382,870 | 1/1995 | Thoms | 313/402 |
| 5,416,377 | 5/1995 | Kim | 313/402 |

OTHER PUBLICATIONS

New Riverside University Dictionary Copyright 1984, by Houghton Mifflin Company.

*Primary Examiner*—Sandra L. O'Shea
*Assistant Examiner*—Mack Haynes
*Attorney, Agent, or Firm*—Jacobson & Johnson

[57] ABSTRACT

A composite shadow mask for a cathode ray tube or the like having a first shadow mask and a second support shadow mask shiftably positioned with respect to each other, with the first shadow mask made of a first material of a first thickness with the first shadow mask having a first set of openings therein, and a second shadow mask made of a second material of a second thickness, with the second shadow mask having a second set of openings so that when the first shadow mask is placed in surface-to-surface contact with the second shadow mask, the first set of openings and the second set of openings are in register with one another to thereby permit passage of an electron beam to be defined by openings in the first shadow mask even though the masks can shift with respect to each other during use.

20 Claims, 2 Drawing Sheets

COMPOSITE SHIFTABLE APERTURE MASK

FIELD OF THE INVENTION

This invention relates generally to shadow masks and, more particularly, to a composite shadow mask in which one shadow mask provides the boundaries for the precise line-of-sight openings for the electron beams and the other shadow mask provides the structural strength and low microphony for the first shadow mask, and together, the two shadow masks provide high magnetic shielding.

BACKGROUND OF THE INVENTION

Manufacture of shadow masks for television tubes entails forming a plurality of openings in the shadow mask. Typically, the openings are either elongated or circular. The sides or edges of the openings form boundaries which limit the size of the electron beams passing therethrough and excite the suitable phosphor on the face of a television tube.

One of the problems with shadow masks with high precision openings, and particularly domed masks, is the need to fabricate them from expensive metals such as nickel-iron alloys rather than cheaper materials such as cold-rolled steel. The domed mask must be sufficiently thick to support its structure. When the shadow mask is made of nickel-iron alloys such as Invar, the result is a very high precision but also a relatively expensive mask. The present invention uses two masks, one of higher quality metal and the other of lower quality metal to yield a low cost and high precision shadow mask.

U.S. Pat. Nos. 3,789,939, 3,574,013 and others show two or more sheets of metal which are laminated together to form a shadow mask. U.S. Pat. No. 3,574,013 shows one of the layers removed before placing the mask in the television tube.

U.S. Pat. No. 5,079,477 shows yet another two-layer mask in which two plates are spot-welded together. The holes in the thinner plate form the line-of-sight opening for the electron beam with bridges in the back plate overlapping the openings in the front plate.

In general, masks made of two different materials are unsuitable for use in a television tube unless the coefficient of thermal expansion of both materials is approximately the same as the mask. Otherwise, the mask with different materials will buckle or bend as the masks heat.

Still other patents such as U.S. Pat. Nos. 4,392,914 and 4,562,377 show a television tube having two shadow masks which are spaced apart from each other.

One of difficulties encountered with a shadow mask is that the mask is heated during use it induces stresses and causes the mask to buckle or bend which can result in distortion of the image. Typically, during operation of a television tube, the temperature of the shadow mask can increase 75° to 100° C.

One metal which is particularly suited and widely used for such shadow masks is iron nickel alloys, as they can be etched with precision openings. One such nickel iron alloy which is commercially available is Invar. It has a low thermal coefficient of expansion which is substantially identical to the coefficient of expansion of glass used in the television picture tube. Although Invar metal is well suited for use in shadow masks, it is a relatively expensive nickel-iron alloy. Prior-art U.S. Pat. No. 4,751,254 describes various nickel-iron alloys as well as Invar.

The present invention is a composite two-part shadow mask that provides precise openings, with low microphony and high magnetic shielding by providing a first thinner shadow mask made of the more expensive metal to provide the boundaries for the precise line-of-sight openings and a second, thicker mask of a less expensive material to impart the structural strength and low microphony, with the combination of the two yielding high magnetic shielding. Microphony is a condition in which the mask begins to vibrate because the sound resonates the metal. Microphony results in a shaky picture.

In the present invention, a thinner mask with the precise openings and low thermal coefficient of expansion is placed in a shiftable position with respect to a second, thicker shadow mask which has a set of larger openings. The thicker mask provides the structural strength for the two masks. Because the masks contact each other, the thicker mask can be used to support the thinner mask. Placing the openings in the two masks in register with each other and having the openings in the support mask sufficiently large the openings allows the thinner mask to determine the size of the electron beam that passes through the composite mask during shifting of the masks with respect to each other. Having the openings of the support mask sufficiently large allows the manufacture of masks from materials which have different coefficient of thermal expansion without degrading the image. Thus, manufacture of one mask with precision openings using more expensive metals while fabricating the support mask with less expensive metals reduces the overall cost of the shadow mask and improves mask quality.

In addition, to provide a lower cost mask with high quality, the etching of two masks, one of a nickel-iron alloy and the other of cold-rolled steel, reduces pollution, as the etching of the steel permits recycling of the etchant but the etching of nickel-iron alloys provides a residue that has to be disposed of.

BRIEF DESCRIPTION OF THE PRIOR ART

U.S. Pat. No. 3,787,939 shows a shadow mask of multi-layer metal wherein two metals are bonded to each other with one of the metal layers having a lower melting point than the other with bonding between the two metal layers accomplished by plating spraying or rolling.

U.S. Pat. No. 3,894,260 shows a mask suspension system that uses a bi-metal strip to reduce the build-up of expansion-induced stress in the suspension system.

U.S. Pat. No. 4,942,332 shows a slit mask with ties between the strips to facilitate handling of the mask during mask and tube fabrication.

U.S. Pat. No. 4,971,590 shows a mask in which a surface layer is applied to the mask to increase the heat-dissipating capacity of the mask.

U.S. Pat. No. 5,079,477 shows a shadow mask made of a front and rear plate which are joined to each other, with the plates having a thickness of 0.2 mm and 0.3 mm with the plates joined to each other by spot-welding along the peripheral edges of the mask.

U.S. Pat. No. 3,574,013 shows a shadow mask with a first layer and a second layer of zinc plated onto the the first layer to make a double-layered mask which is used for laying down the phosphor dot pattern. Once the phosphor dot pattern is laid down, the zinc layer is removed to leave a single layer mask.

U.S. Pat. Nos. 4,723,089 and 4,656,389 show a mask with members for precisely positioning the funnel and the face-plate.

U.S. Pat. No. 4,751,424 shows a shadow mask made from an improved iron-nickel alloy sheet.

U.S. Pat. No. 4,392,914 shows a shadow mask in which two mask are domed in one operation but are then separated and spaced apart when placed into the television tube.

U.S. Pat. No. 4,562,377 shows another shadow mask in which two masks are located in a spaced-apart position in a television tube with the masks being electrically insulated from each other.

U.S. Pat. 4,593,224 shows a foil mask which is suppurated by mounting members that keep the foil mask in tension.

U.S. Pat. No. 4,259,611 shows a segmented shadow mask in which a plurality of masks are spaced in a side-to-side relationship to form a shadow mask.

U.S. Pat. No. 4,389,592 shows a shadow mask in which the line-of-sight opening in the shadow mask has a portion of the opening defined by one side of the mask and a further portion of the opening defined by the other side of the mask.

SUMMARY OF THE INVENTION

Briefly, the invention comprises a composite shadow mask for a cathode ray tube or the like having a first shadow mask and a second shadow mask located in continuous surface contact with each other and shiftably positioned with respect to each other.

The first shadow mask is made of a first material of a first thickness with the first shadow mask having a first set of precise openings therein and a second support shadow mask made of a second material of a second but larger thickness with the second support shadow mask having a second set of openings larger than the first set of openings, so that when the first shadow mask is placed on top of the second shadow mask, the first set of openings and the second set of openings remain in register with one another even though the two masks can shift with respect to each other due to temperature changes in the television tube. Thus, the size of an electron beam is defined only by the size of openings in the first shadow mask even though the second shadow mask may shift with respect to the first shadow mask due to heating of the shadow masks.

DESCRIPTION OF THE PREFERRED EMBODIMENT

Figure 1:
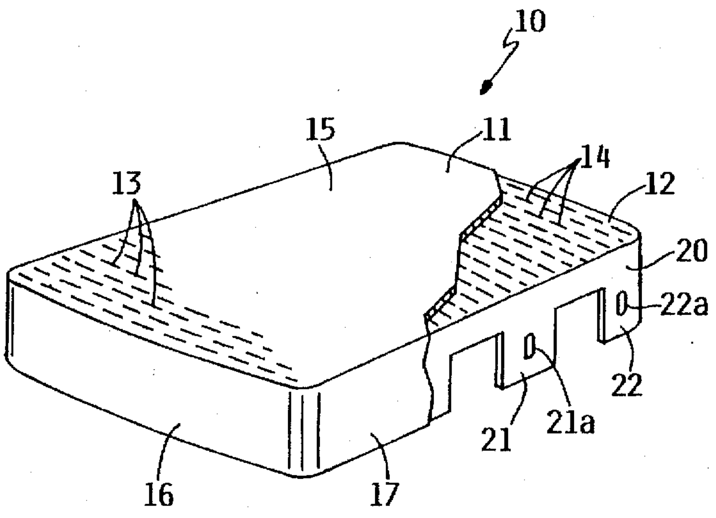
FIG. 1 is a perspective view of a composite shadow mask.

FIG. 1 reference numeral 10 generally identifies a composite shadow mask for a cathode ray tube or the like having a first domed shadow mask 11 and a second domed support shadow mask 12 shiftably positioned with respect to shadow mask 11. Support shadow mask 12 is in continuous surface contact with shadow mask 11 to provide support for mask 11.

Shadow mask 11 includes a continuous skirt formed by side 16 side, 17 and two additional sides (not shown) Located in the face of outer shadow mask 11 is a set of elongated openings 13 and, similarly, located in the face of shadow masks 12 is a set of larger elongated openings 14 which are positioned so that when shadow mask 11 is positioned over shadow mask 12, the set of openings 13 and 14 are in register with each other and permit passage of electron beams therethrough.

Shadow mask 12 also includes a skirt formed by a set of rectangular shaped tongues which are located in a spaced relationship to each other. FIG. 1 shows two of the tongues with tongue 21 including an elongated slot **21*a* and tongue 22 with an identical elongated slot 22*a*** for engagement with a support pin mounted to a support frame.

Figure 2:
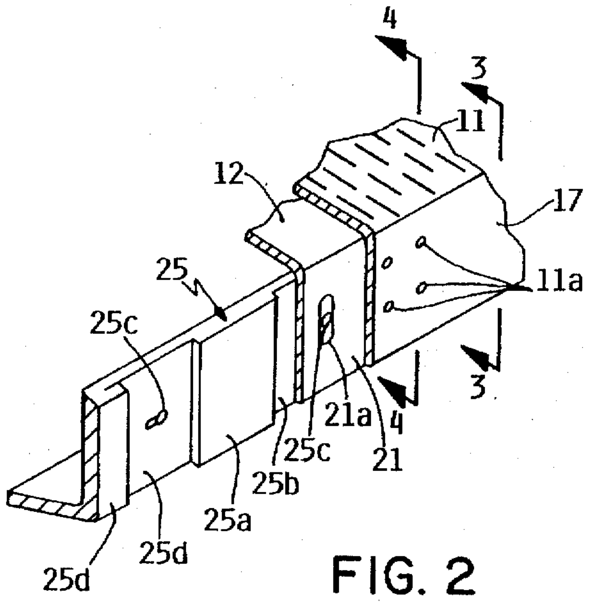
FIG. 2 is a partial cross-sectional view showing a portion of the composite shadow mask support frame with one shadow mask fixedly attached to the frame and the other shiftably attached to the frame.

FIG. 2 shows the relationship of shadow mask 11 and support shadow mask 12 to a shadow mask support frame 25. Support frame 25 is mounted in television tube (not shown) and extends around the peripheral skirt area of mask 11 and mask 12 to hold the two masks in an operable position during use. Frame 25 has a general L-shaped cross section with a set of recesses and flat mask-fastening areas spaced around the periphery.

FIG. 2 shows two of the flat mask-listening areas **25*a* and 25*e* and shows two of the recess areas 25*b* and 25*d* therein for slideingly engaging the tongues of support shadow mask 12. FIG. 2 shows tongue 21 partially in cross-section with an elongated opening 21 positioned around pin 25*c* extending from frame 25. The use of a cylindrical pin 25*c* and elongated slots permits mask 12 to shift or slide vertically with respect to frame 25 to compensate for unequal thermal expansion of mask 11 and mask 12**.

Mask 11 is shown permanently attached to a flat mask-fastening area on support frame 25 through spot-welding **11*a* while the support mask 12 is allowed to move back and forth to maintain support for mask 11 without buckling mask 11**.

Figure 3:
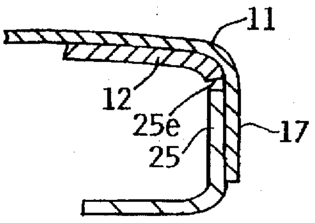
FIG. 3 shows a cross-sectional view of the shadow mask frame and shadow masks taken along lines 3—3 of FIG. 2.

FIG. 3, which is taken along lines 3—3 of FIG. 2, shows the relationship of frame 25 and shadow mask 11 and 12 in the region where mask 11 is spot-welded to frame 25 by spot-welds **11*a*. The figure shows the end 12*e* of mask 12 spaced from the edge of frame 25 to permit shifting of mask 12 with respect to mask 11 and frame 12, while still providing support to mask 11, as the temperature of mask 11 and mask 12 increases while skirt 17 is permanently fastened to frame 25**.

Figure 4:
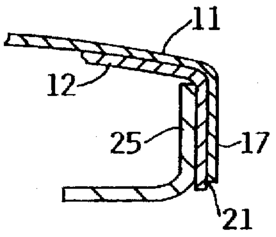
FIG. 4 shows a cross-sectional view of the shadow mask frame and shadow masks taken along lines 4—4 of figure.

FIG. 4, which is taken along lines 4—4 of FIG. 2, shows the relationship of frame 25 to shadow mask 11 and shadow mask 12 in the region where the skirts of the two shadow mask overlay each other. In this condition, support shadow mask 12 is in surface contact with shadow mask 11 to support shadow mask 11. Tongue 21 can slide vertically with respect to skirt 17 and frame 25 to continue to provide support for mask 11 even though mask 12 may have a higher coefficient of thermal expansion than mask 11.

Figure 5:
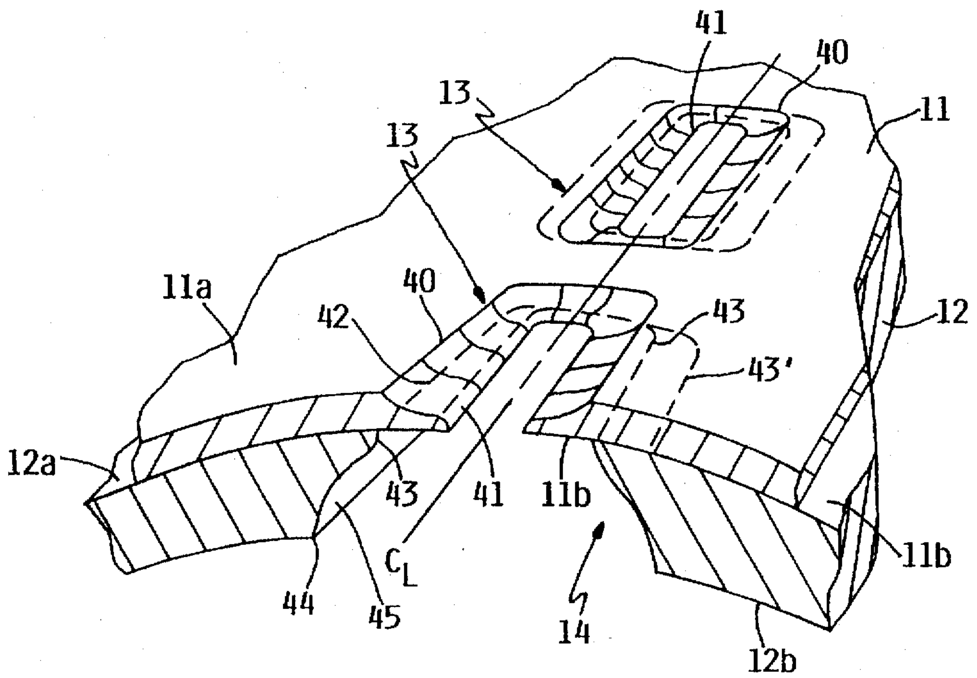
FIG. 5 shows an enlarged portion of the composite mask of FIG. 1.

FIG. 5 shows a portion of shadow mask 11 and support shadow mask 12 that reveals the register relationship of a smaller aperture 13 in shadow mask 11 to a larger aperture 14 located in shadow mask 12. As the relationship of all the openings in the two masks is the same, the relationship of only two apertures will be described. Note, a continuous edge 41 in mask 11 defines the line-of-sight opening boundary for the electron beams to pass through the composite shadow mask 10. Typically, aperture 13 is formed by etching with an outer boundary 40 located in surface 11*a*. During etching the thickness of mask 11 gradually decreases from boundary 40 to edge 41 and forms a sloped transition region identified by reference numeral 42.

The lower larger opening 14 in shadow mask 12 is positioned immediately below and in axial alignment with a center, $C_L$, extending through apertures 13 and 14. The lower opening 14 is defined by edge 43 in surface 12*a*. Typically, aperture 12 is formed by etching with an outer boundary 44 located in surface 12*b*. The thickness of mask 12 gradually decreases from boundary 44 to edge 43 through a sloped transition region identified by reference numeral 45.

To illustrate the shiftable relationship of masks 12 to mask 11, FIG. 5 shows the two masks at room temperature with each of the apertures 13 and 14 in substantially axial and lateral alignment. In this condition, the edges of 41 of each of the openings 13 in mask 11 define the boundaries of the line-of-sight openings through the composite shadow mask 10 which limits the size of the electron beam passing through the mask. During use in a television picture robe or the like, the temperature of the masks 11 and 12 increases and as it increases, top mask 11 with its lower coefficient of thermal expansion expands less than lower mask 12 with the higher coefficient of thermal expansion. However, while mask 11 is fixedly mounted to frame, 25 support mask 12 is shiftably mounted to frame 25 and is allowed to shift slightly due to thermal expansion. The boundary 43 of opening 14 in mask 12 is sufficiently large so that even though opening 43 in mask 12 shifts to the position indicated by dotted line 43, openings 13 and 14 remain in register and the edges of opening 13 in mask 11 continue to define the line-of-sight boundaries through shadow mask 11.

Figure 6:
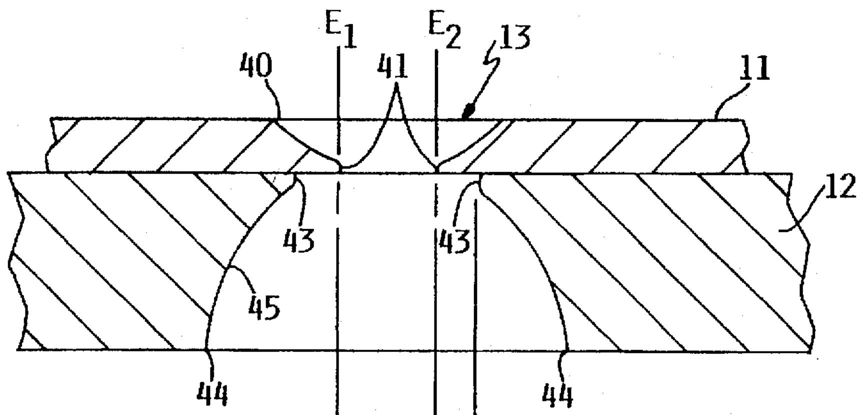
FIG. 6 shows the position of each of the shadow masks in FIG. 1.
Figure 7:
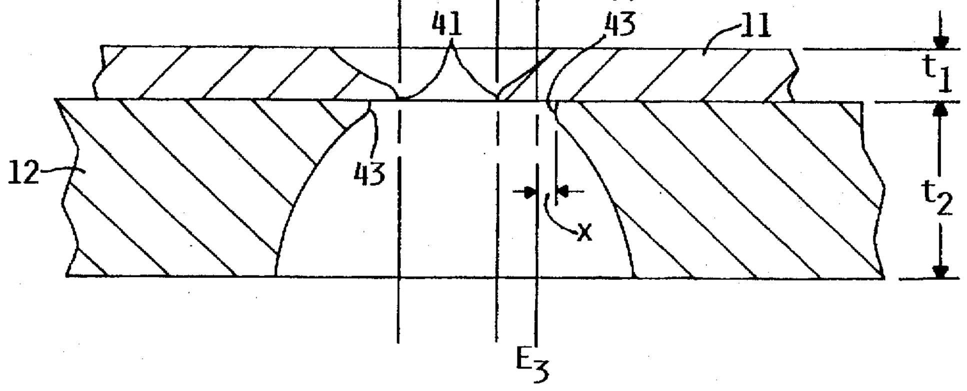
FIG. 7 shows the shifted position of the lower shadow mask with respect to the top shadow mask during use of the composite shadow mask.

FIG. 6 and FIG. 7 show masks 11 and 12 in cross-section and illustrate both the relative thickness of the two masks and the shiftable relationship of mask 12 to mask 11 while still maintaining the same line-of-sight boundaries in the composite mask 10.

FIG. 6 and FIG. 7 show a line, $E_1$, extends through one side of the top edge 41 in shadow mask 11, and similarly, a second line, $E_2$ extends through the opposite edge 41. In FIG. 6, these two lines represent the position of the opening in mask 11 with respect to the opening in support mask 12 when the masks are at room temperature. Note that the openings in the two masks are in substantial alignment with each other FIG. 6 and FIG. 7 also show a line, $E_3$, extending vertically from edge 43 in FIG. 6 to FIG. 7 with line $E_3$ spaced a distance x from line $E_3$. FIG. 7 is intended to illustrate the shifting of the the two shadow masks 11 and 12 after the temperature of the two masks has increased due to operation of a picture tube.

Note that edge 41 remains in the same position as indicated by reference lines $E_1$ and $E_2$, while edge 43 has been displaced a distance x from reference line $E_3$. Even though mask 12 has shifted with respect to mask 11, the edges of mask 11 continue to define the line-of-sight boundary through composite mask 10. That is, by having the openings in the support mask sufficiently large even though the two masks have different thermal expansion rates, the two openings in the two masks remain in register with one another, That is, mask 12 does not overlap and partially block the openings 13 in mask 11. While the shifting of the two masks has been illustrated in only one axis, the shifting of the masks in the other axes likewise does not cause the support mask to overlap and obscure the openings in the top mask 11. In most applications it is preferred to have the larger openings 2 to 3 times larger than the smaller openings to ensure that the support mask does not block the smaller openings in the shadow mask.

With the present invention, the thinner mask 11, which precisely defines the openings, can be etched from more expensive metal such as Invar steel to obtain accurate and precise openings therein, while the second mask with larger openings that is used to provide the structural support for the composite mask can be etched from less expensive materials.

FIG. 7 shows that mask 11 has a thickness identified by $t_1$ and that mask 12 has a thickness identified by $t_2$. When mask 11 is made from Invar steel or other high precision metals, the thickness of mask 11 should be sufficiently thick to maintain structural integrity but sufficiently thin to provide for forming precise openings as well as minimum cost. In most instances having the mask sufficiently thin so as to characterized by requiting support when located in a television tube and sufficiently thick that the integrity of the mask is maintained for handling. Most metals require a minimum metal thickness of 50 microns to maintain structural integrity of the mask. Generally, with thicknesses less than 50 microns, the mask looses its structural integrity and behaves like a foil rather than a metal. Mask 12, which provides the support, must have sufficient strength to support both masks. A support mask made of cold rolled steel can range in thickness from approximately 150 to 250 microns and still provide sufficient support for both masks. In general in the composite shadow mask the thickness of the first shadow mask is less than 25 percent of the thickness of the second shadow mask.

We claim:

1. A composite shadow mask for a cathode ray tube or the like comprising:

a first shadow mask made of a first material of a first thickness, said first shadow mask having a first thermal expansion rate and characterized by having the first thickness sufficiently thin so as to require structural support when placed in a television tube, said first shadow mask having a first set of openings therein defining a passage for an electron beam through said first shadow mask;

a second shadow mask made of a second material of a second thickness, said second shadow mask having a second thermal expansion rate, said second shadow mask being sufficiently strong to shiftably support said first shadow mask and itself with said second shadow mask having a second set of openings in alignment with said first set of openings with said second set of openings sufficiently larger than said first set of openings so that when said first shadow mask shifts with respect to said second shadow mask due to an increase or decrease in the temperature of said first shadow mask and said second shadow mask said second shadow mask does not block said first set of openings to thereby allow said first set of openings to continue to define the passage for the electron beam through both said first shadow mask and said second shadow mask even though the first shadow mask shifts with respect to the second shadow mask.

2. The composite shadow mask of claim 1 when the first material is a nickel-iron alloy.

3. The composite shadow mask of claim 1 wherein first shadow mask and the second shadow mask are domed.

4. The composite shadow mask of claim 2 wherein the second material is cold-rolled steel.

5. The composite shadow mask of claim 1 wherein the first set of openings are elongated slots.

6. The composite shadow mask of claim 1 wherein the thickness of the first shadow mask is less than 25 percent of the thickness of the second shadow mask.

7. The composite shadow mask of claim 1 wherein the first shadow mask has a first coefficient of thermal expansion and is fixedly held and said second shadow mask has a second coefficient of thermal expansion which is grater than said first coefficient of expansion and said first shadow mask is slidingly supported so than when said first shadow mask and said second shadow mask are heated, said second shadow mask can shift while supporting said first shadow mask without forcing the first set of openings and the second set of openings out of register with each other.

8. The composite shadow mask of claim 1 wherein the thickness of the first shadow mask is greater than 50 microns.

9. The composite shadow mask of claim 1 wherein the thickness of the second shadow mask is at least 150 microns.

10. The composite shadow mask of claim 1 wherein said first shadow mask is sufficiently thick to have structural integrity.

11. The composite shadow mask of claim 1 wherein said second shadow mask provides structural support for said first shadow mask.

12. The composite shadow mask of claim 1 wherein the openings in said second shadow mask are about twice the size of the openings in said first shadow mask.

13. The composite shadow mask of claim 1 wherein said first shadow mask has a first alignment region and said second aperture has a second alignment region so that when said first alignment region and said second alignment region are in alignment with each other, said first set of openings and said second set of openings are in register with each other.

14. A composite shadow mask for a cathode ray tube or the like comprising:

a mask support frame;

a first shadow mask made of a first material and fixedly mounted to said mask support frame, said first shadow mask having a first set of openings therein for defining the size of an electron beam passing therethrough, said first shadow mask being sufficiently thick so as to provide structural integrity but sufficiently thin so as to require structural support within said frame, said first shadow mask characterized by having a first thermal expansion rate;

a second shadow mask made of a second material of a second thickness, said second shadow mask characterized by having a second thermal expansion rate different from said first thermal expansion rate; said second shadow mask sufficiently strong so as to provide structural support for both said first shadow mask and said second shadow mask with said second shadow mask shiftably mounted on said support frame to support said first shadow mask in response to changes in temperature of the shadow masks, said second shadow mask having a second set of openings in alignment with the first set of openings and sufficiently larger than said first set of openings so that when said first shadow mask and said second shadow mask shift with relation to one another due to increase or decrease in the temperature of the shadow masks the second shadow mask does not block the first set of openings in the first shadow mask, to thereby permit passage of an electron beam through the openings in both said first shadow mask and said second shadow mask, with a size of the electron beam determined by the shape and size of the openings in the first shadow mask.

15. The composite shadow mask of claim 14 wherein said mask support frame has a set of mask-fastening areas and a set of recesses.

16. The composite shadow mask of claim 15 wherein said first shadow mask has a skirt permanently fixing said first shadow mask to said mask-fastening areas on said mask support frame.

17. The composite shadow mask of claim 16 wherein said second support shadow mask has a plurality of tongues for sliding within said set of recess to permit said second mask to shift with respect to said first mask.

18. The composite shadow mask of claim 17 wherein said frame includes pins for engaging an opening in said tongues to limit the travel of said second support mask.

19. The composite shadow mask of claim 18 wherein the first shadow mask is spot-welded to said frame.

20. The composite shadow mask of claim 19 wherein the first mask and the second mask have a domed shape.

* * * * *